United States Patent [19]
Chou

[11] Patent Number: 5,433,284
[45] Date of Patent: Jul. 18, 1995

[54] ELECTRICAL BICYCLE

[76] Inventor: Wen-Cheng Chou, No. 1-2, Lane 975, Chun-Jih Road, Tao-Yuan City, Taiwan

[21] Appl. No.: 317,530

[22] Filed: Oct. 4, 1994

Related U.S. Application Data

[63] Continuation-in-part of Ser. No. 170,832, Dec. 21, 1993, Pat. No. 5,368,122.

[51] Int. Cl.[6] .................. B62M 23/02; B60K 1/00; B62K 11/10
[52] U.S. Cl. .................. 180/205; 180/220; 180/65.2; 280/214
[58] Field of Search .............. 280/212, 214, 215; 180/220, 230, 231, 205, 65.2, 65.6, 65.7

[56] References Cited

U.S. PATENT DOCUMENTS

| | | | |
|---|---|---|---|
| 1,297,218 | 3/1919 | Merkel | 180/205 X |
| 2,586,702 | 2/1952 | Obram | 180/230 |
| 4,671,524 | 6/1987 | Haubenwallner | 280/212 |

FOREIGN PATENT DOCUMENTS

| | | | |
|---|---|---|---|
| 2623800 | 4/1987 | Germany | 180/220 |
| 3200498 | 9/1991 | Japan | 180/220 |
| 4038289 | 2/1992 | Japan | 180/220 |

*Primary Examiner*—Brian L. Johnson
*Assistant Examiner*—F. Zeender
*Attorney, Agent, or Firm*—Morton J. Rosenberg; David I. Klein

[57] ABSTRACT

An improvement to electrical bicycles is provided. The bicycle is improved by directly securing a one-way driving assembly to the left side of the driving wheel's hub and forming a one-piece unit with the hub. By having an inserting body protruding from a rotating body, a large bevel gear wheel of the driving assembly is joined with the rotating body. An output bevel gear wheel of a D.C. motor is engaged with the large bevel gear wheel to directly drive the hub in a forward direction. The hub may also be pedal driven so the function of the pedals is not changed.

4 Claims, 10 Drawing Sheets

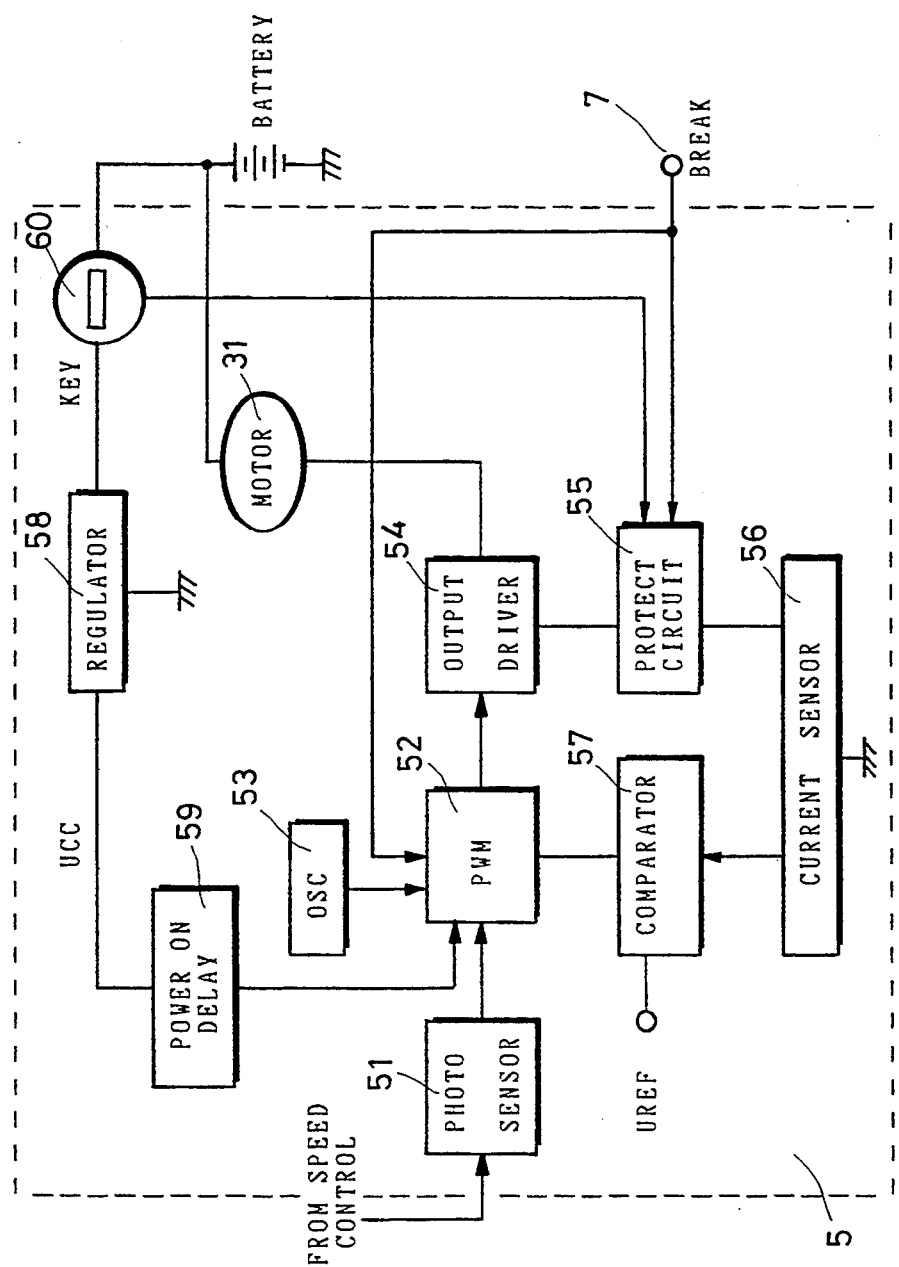
F I G. 8

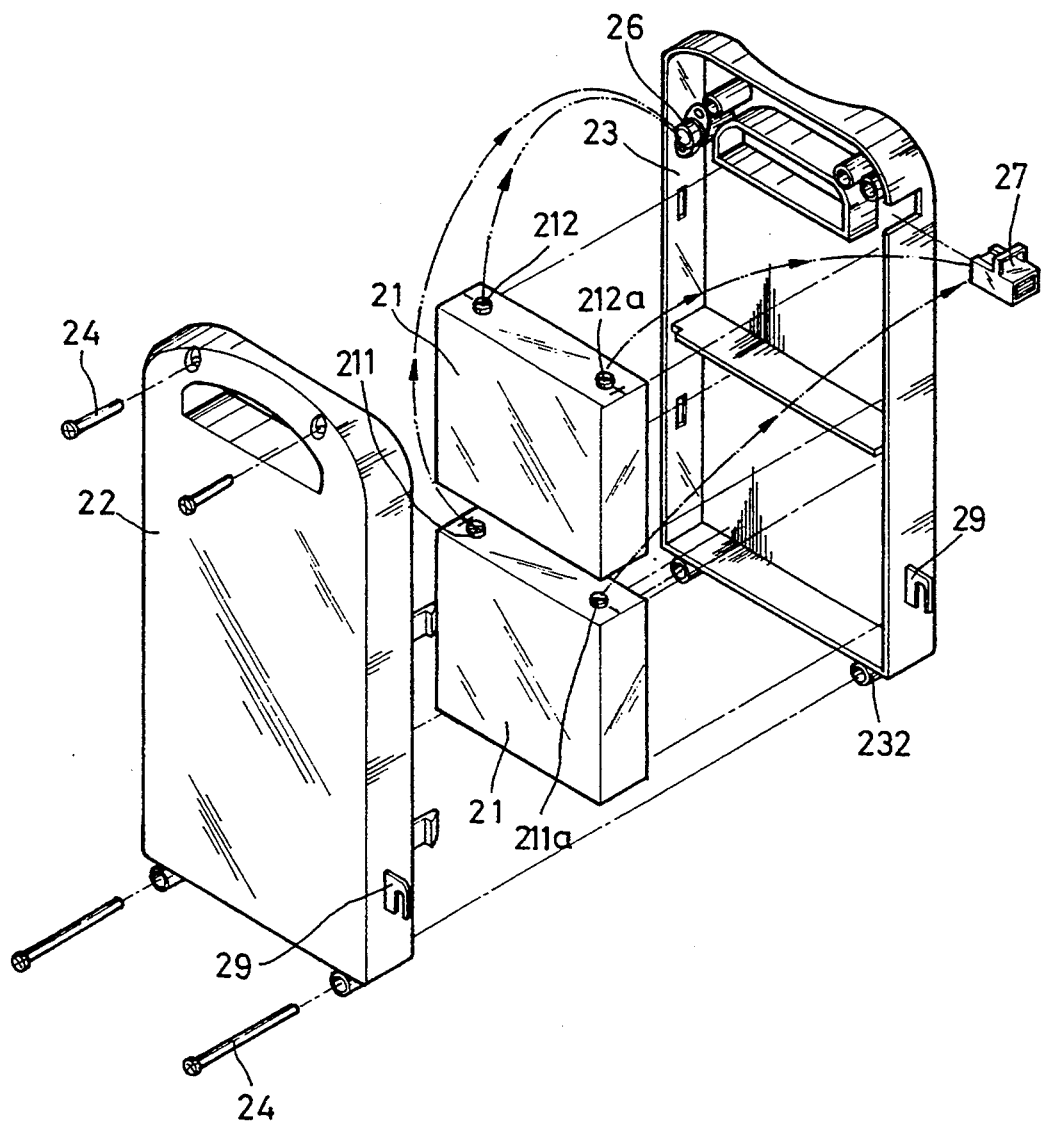
F I G. 9(C)

ELECTRICAL BICYCLE

This invention is a Continuation-in-Part of U.S. patent application entitled ELECTRICAL BICYCLE, Ser. No. 08/170,832, filed 21 Dec. 1993, now U.S. Pat. No. 5,368,122.

BACKGROUND OF THE INVENTION

The present invention gives the electrical bicycle a smoother and more fluid transmission than prior designs and provides for quicker assembly, disassembly and maintenance.

In prior systems, the transmission drive is fixed on the rear stays and mounted on the side of the hub. The transmission case set and flywheel, for such systems, is separately mounted on each end of the hub, with a D.C. motor to drive the bicycle. The motor directly drives the transmission case set in a forward motion, starting and driving the rotation of the hub when reducing the speed of the gear wheels on the freewheel.

SUMMARY OF THE INVENTION

The object of this invention is to improve the electrical bicycle to allow the driving movement to become smoother and more fluid.

It is another objection of the invention to provide for quicker assembly, disassembly and maintenance of electrical bicycles, which will in turn reduce costs.

BRIEF DESCRIPTION OF THE DRAWINGS

In the drawings:

FIG. 8 is an electrical block diagram of the shifting controller of the present invention;

FIG. 9C is an exploded perspective view of the battery pack of the present invention.

DESCRIPTION OF THE PREFERRED EMBODIMENT

Figure 1:
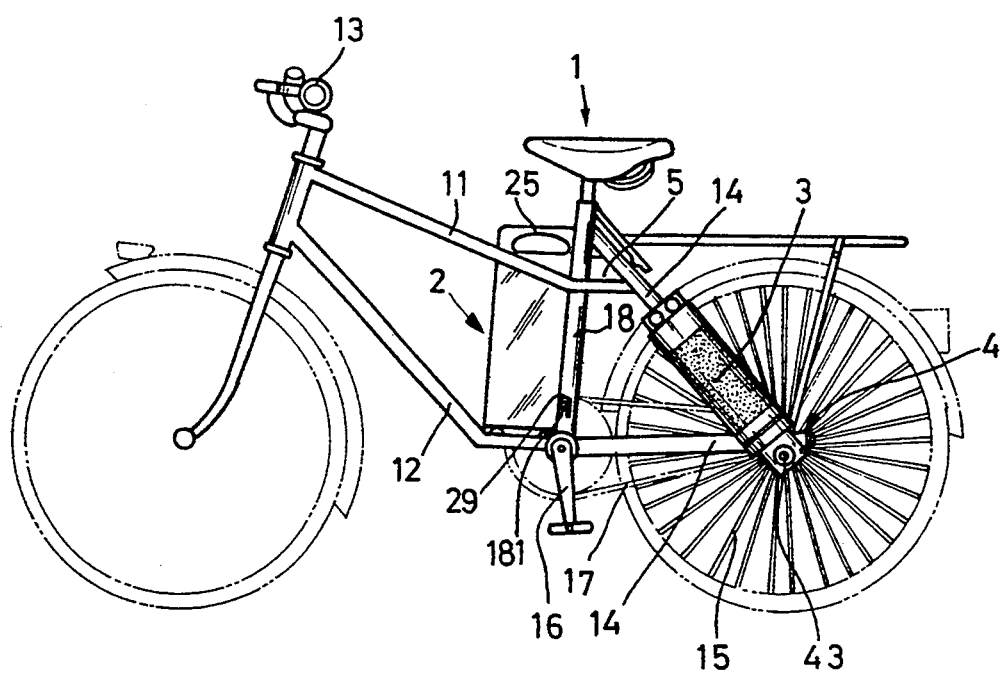
FIG. 1 is an elevation view of an electric bicycle made according to the present invention.
Figure 2:
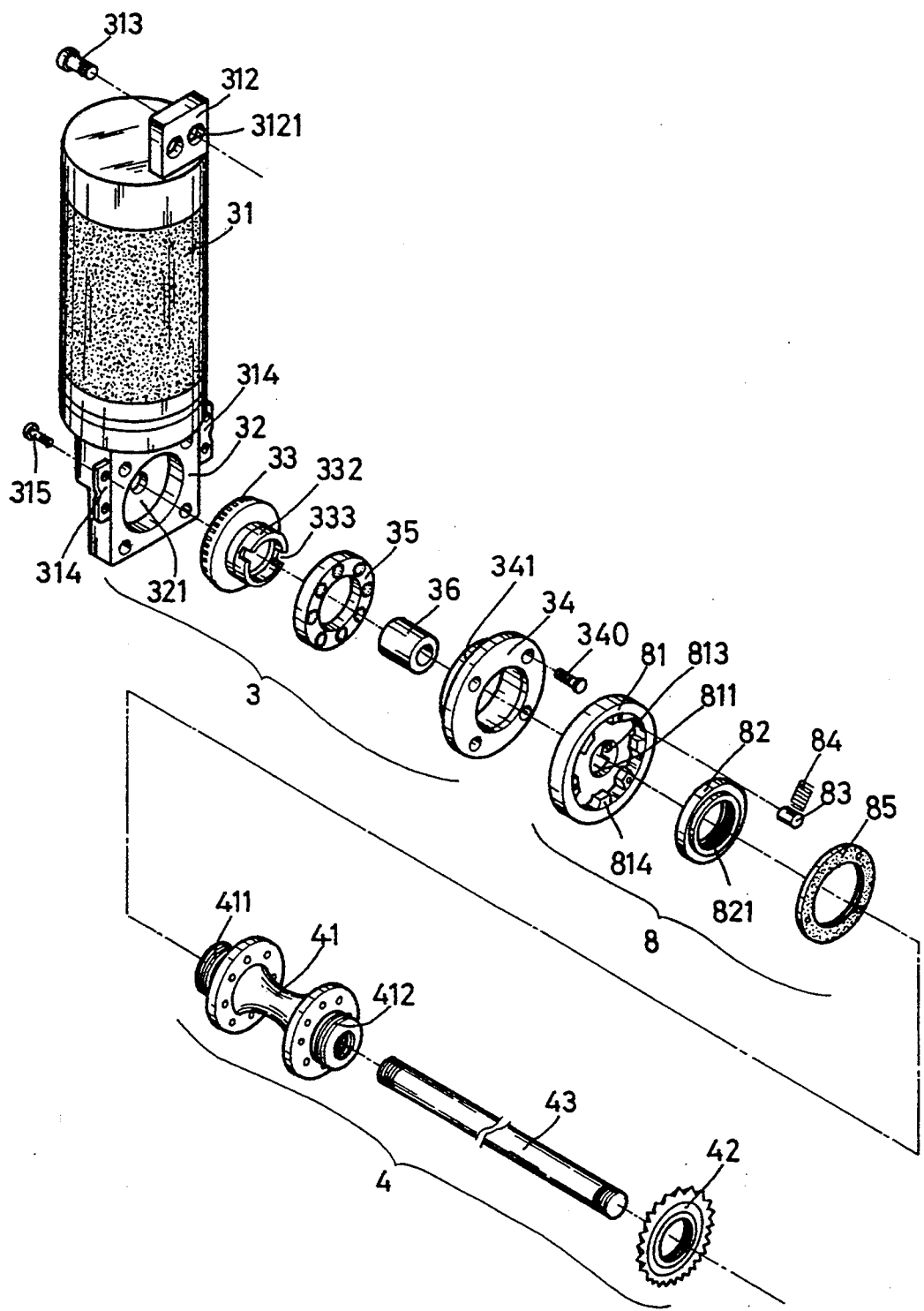
FIG. 2 is an exploded perspective view of the driving mechanism of the present invention.
Figure 3:
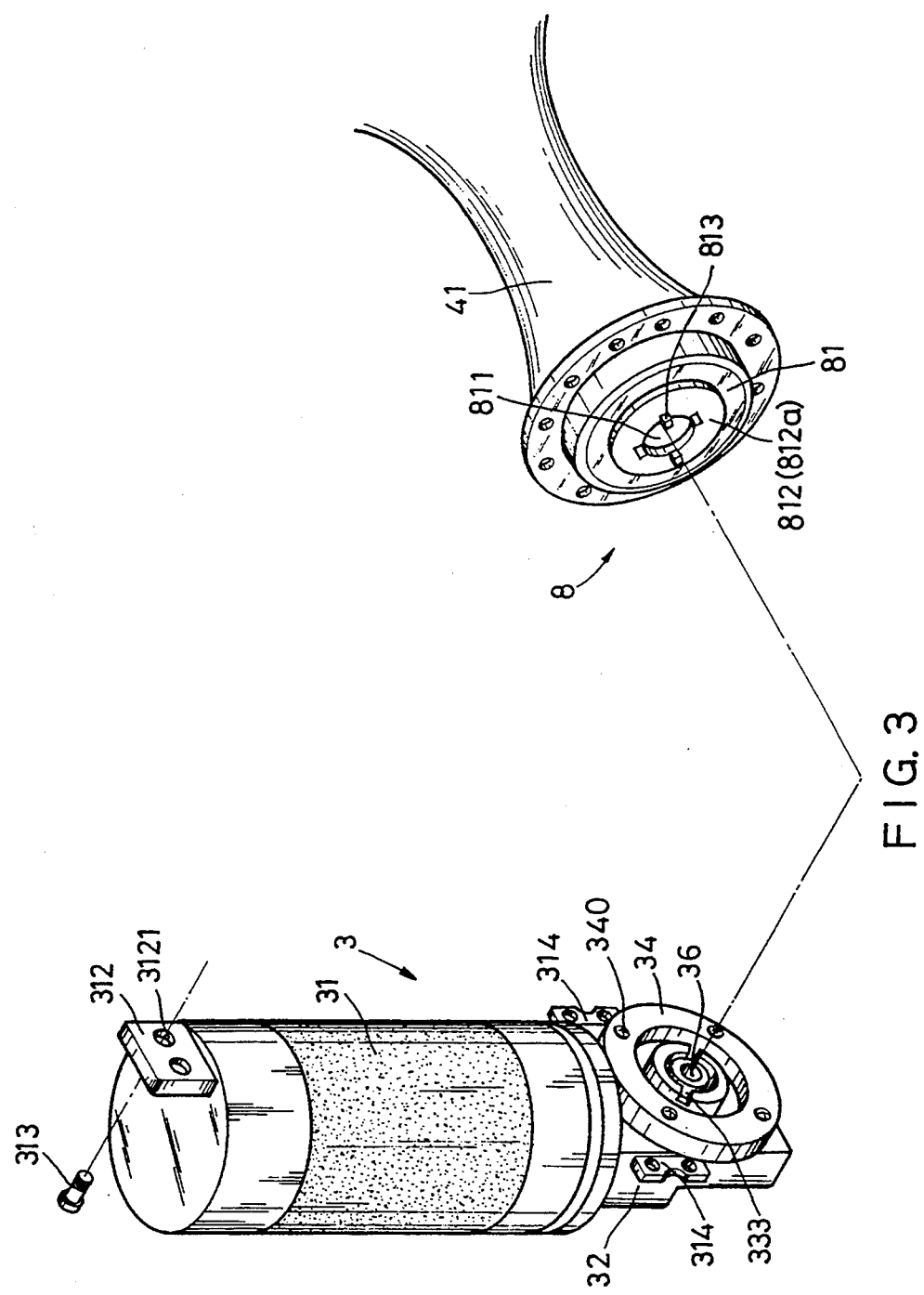
FIG. 3 is a perspective view of the driving mechanism and hub of the present invention.
Figure 7:
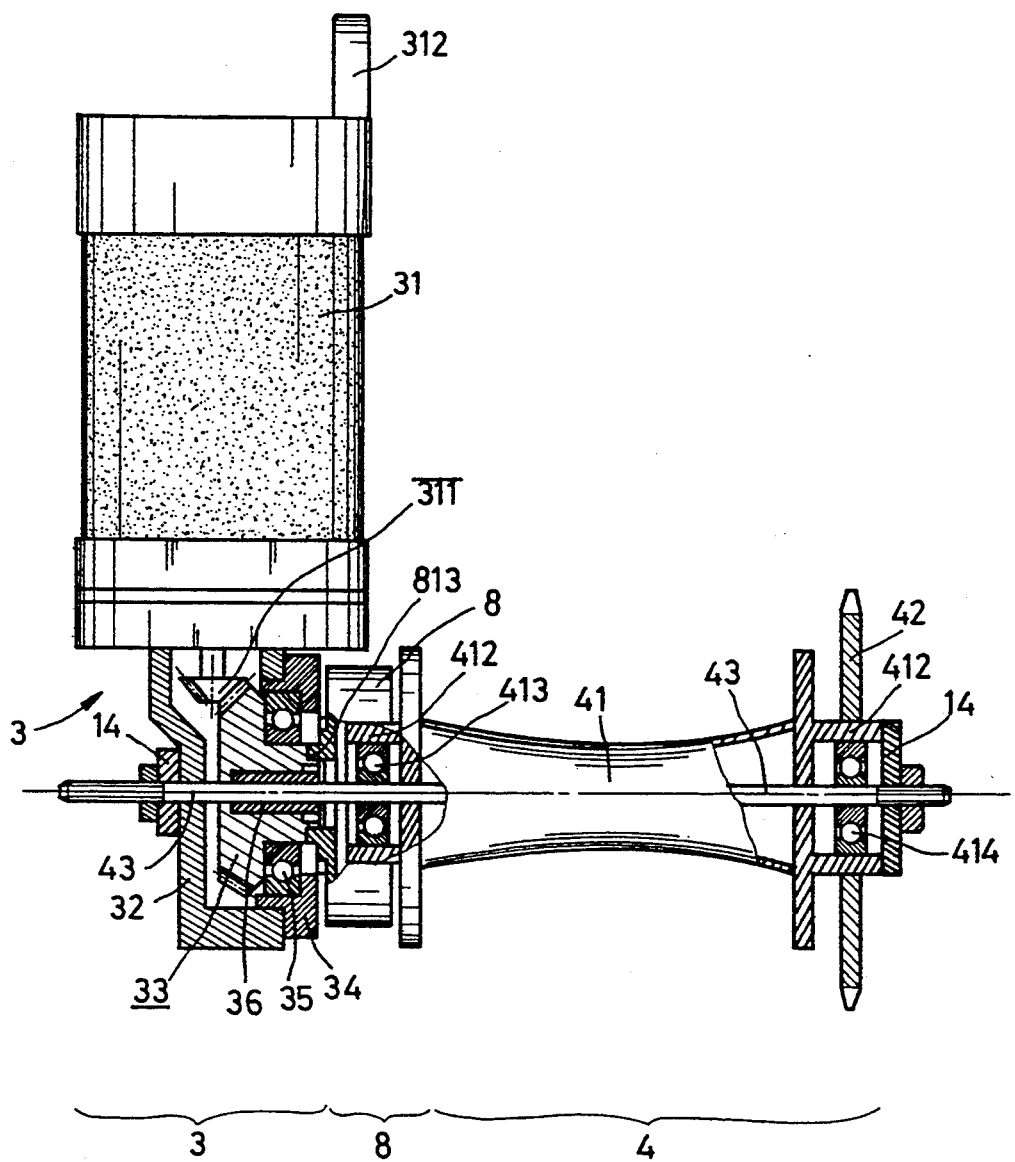
FIG. 7 is a cross-sectional view of the driving mechanism of the present invention.

Referring to FIGS. 1-3, there is shown an electrical bicycle of the present invention wherein the bicycle structure is defined by a bike frame 1. A battery pack 2 is mounted between both an upper tube 11 and a bottom tube 12 of the bike frame. A shifting controller 5 is mounted at the center of the bike frame and can change the control signal to the motor from the handlebar 13. A drive assembly 3 is affixed to bike frame 1 at the side of the rear stay 14. The drive assembly 3 includes D.C. motor 31 having a gear wheel 311 mounted on the motor shaft, as indicated in FIG. 7. The motor 31 has a flange 312 mounted on its upper end with at least one positioning hole 3121 disposed centrally in flange 312. At least one screw 313 secures the upper end of motor 31 into place on the rear stay 14. A mounting base 32 is positioned at the outer edge of the bevel gear wheel 311. The mounting base 32 has a centrally located circular recess 321 formed therein. A pair of mounting flanges 312 are formed on opposing sides of mounting base 32, wherein screws 315 can be used to fix them to the rear stay 14.

A large bevel gear wheel 33 is positioned within the circular recess and meshes with the small bevel gear 311. A fixed base 34 is secured to the mounting base 32 by screws 340 and is mounted with a bearing 35 disposed between the flange 341 of fixed base 34 and the large bevel gear wheel 33. A hub 41 is mounted by a pair of threaded sleeves 411 and 412 disposed on opposing right and left sides thereof. The threaded socket 412, disposed on the left side of hub 41, is for threaded securement of chain sprocket 42 into place thereon. A hub axle 43 passes through hub 41, bevel wheel 33 and the fixed base 32, and is fixed onto the rear stay 14. A large bevel wheel 33 whose base is formed with a flange 332, the outer edge of flange 332 being formed with a recess 333 into which the axle set 36 is inserted. The threaded sleeve 411, on the right side of hub 41, is mounted with a one way transmission assembly 8.

Figure 4:
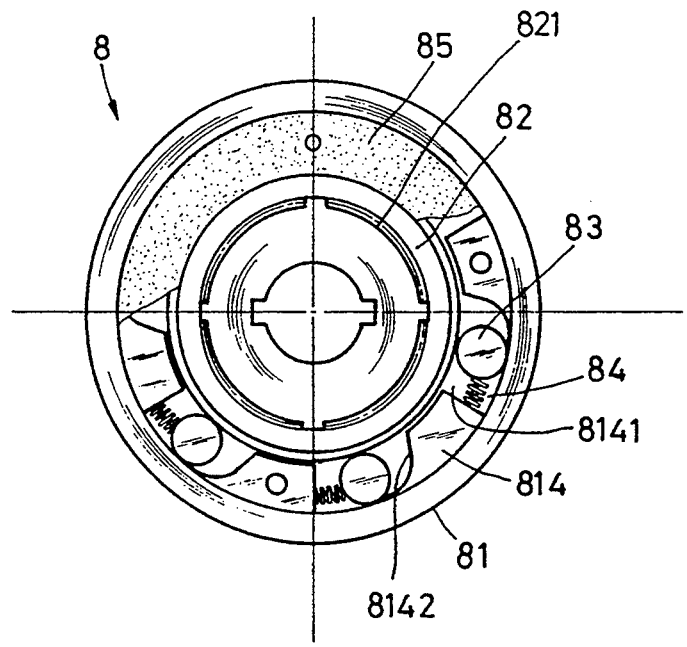
FIG. 4 is an elevation view, partially cut away, of a single directional transmission of the present invention.

A rotating body 81 is formed with an axle hole 811 therethrough. The outer edge of rotating body 81, as shown in FIG. 3, forms a collar 812 which projects outwardly, opposite to recess 333 of the large bevel wheel 33. Collar 812 has an insertion cavity and several positioning bodies mounted on the single piece inner ring portion of the rotating body 81, as shown in FIG. 4, which forms vertical faces 8141 on the front ends of positioners 814 and forms sloping oval shaped rear ends 8142 on the positioners 814. The transmission casing 82 is mounted by means of screw threads 821 formed on its inner edge of an opening formed therethrough. The casing 82 can therefore be screwed onto the threaded sleeve 411 of hub 41 and inserted into the inner circular recess of the fixed body 814. Several springs 84 are positioned between the vertical surfaces 8141 and the drums 83. A cover 85 is secured to the positioner 814, then the transmission casing 82 is positioned within the rotating body 81. Through the assembly defined by the above mentioned components, the D.C. motor 31 can directly drive the hub 41, causing it to rotate or be driven by the pedals, without affecting the existing pedalling function and thereby allowing the bike to incorporate two functions in one.

As shown in FIG. 3, the invention is directly screwed into place on the right side of hub 41, forming a single unit. The single directional transmission assembly 8, through the positioners 814, drums 83 and springs 84 in the interior of the rotating body 81, only allow the rotating body 81 to rotate the transmission casing 82 in one direction to provide a forward motion of the bicycle. Transmission casing 82 is threadedly engaged to the threaded sleeve 411 disposed on the right side of the hub 41. Thus, when the rotating body 81 is driven in a forward direction, it can cause the hub 41 to rotate, achieving the objective of providing a driving force. As shown in FIG. 4, when the rotating body 81 is rotating in a forward motion, the transmission casing 82 is stopped by the springs 84 and drums 83, so it must be put into motion and be rotating forward. However, if one changes over to pedal drive, the transmission casing 82 is put into motion by the hub 41 and the inside of rotating body 81 will be rotating forward. At this time, the drums 83 and springs are compacted, and therefore, the transmission casing 82 within the rotating body 81 will be spinning freely which in turn achieves the function of pedal driven motion.

The single directional transmission drive 8, by means of the insertion body 813 mounted on the outer edge of the rotating body 8, allows the notched recess 333 of the driving assembly to be inserted and fixed into place, thereby allowing the driving assembly 3 to be assembled into a single unit in advance, as shown in FIG. 3. Subsequently, the driving assembly 3 can be screwed in place on the outer edge of the one way transmission drive 8, upon which it can directly move the hub 41 in a forward motion. Not only is this quicker to assemble, but also allows greater convenience in the disassembly of the driving assembly 3 when maintaining and repairing the bevel wheels. This is where the greatest improvement is made in functionality. During maintenance and upkeep of other drive systems, the entire assembly had to be disassembled, which made this work very difficult, and if breakdown or wear occurred, the entire assembly had to be replaced. Therefore, maintenance costs were significantly higher for these other systems. This invention does away with this defect by separating the driving assembly 3 and single directional transmission drive 8 into independent units. This allows assembly and disassembly to be faster and easier, to replace its component parts, having a real effect in lowering costs.

As shown in FIG. 7, the transmission system of the invention utilizes the small bevel gear wheel 311 of the D.C. motor 31 to cause the large bevel gear wheel to rotate, which in turn directly spins the rotating body 81 and hub 41 in a forward motion. This entire transmission process is both smooth and efficient, reducing wear on the parts and also its noise.

Figure 5:
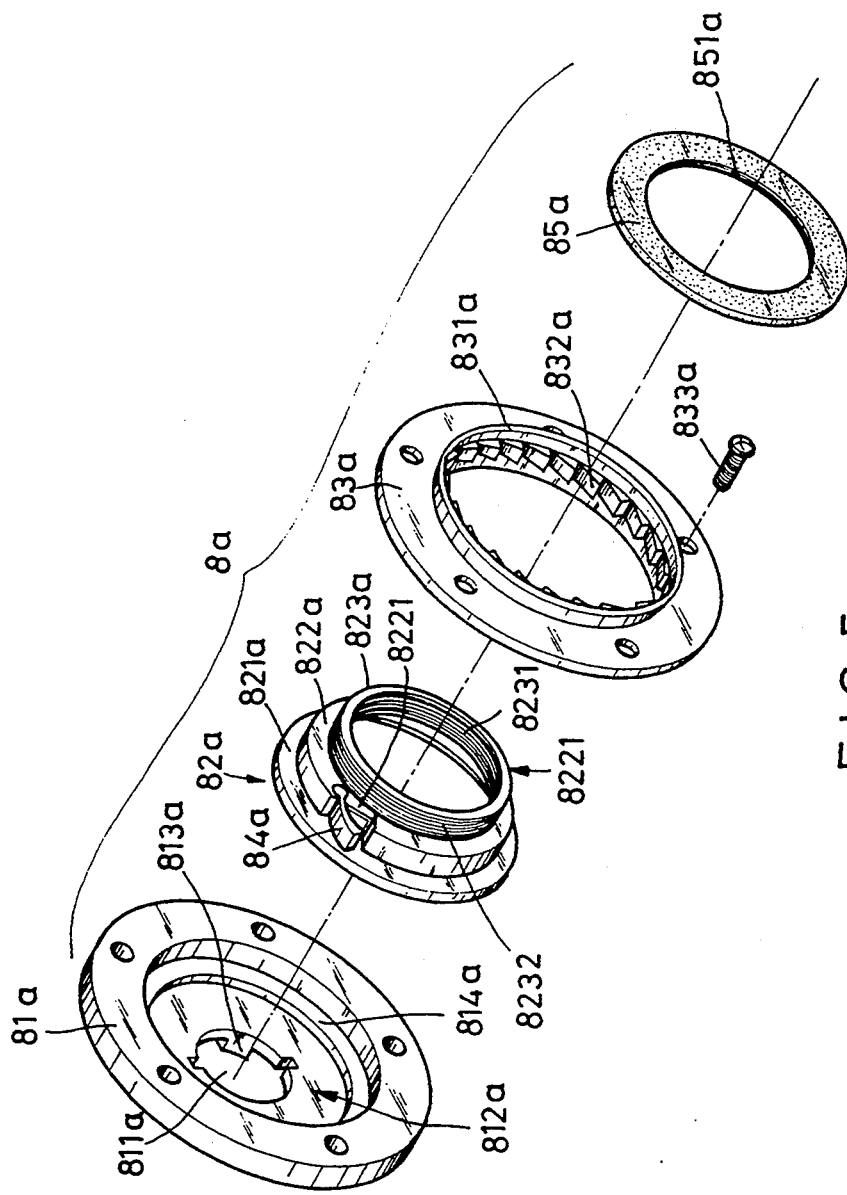
FIG. 5 is an exploded perspective view of an alternative embodiment of a single directional transmission of the present invention.
Figure 6:
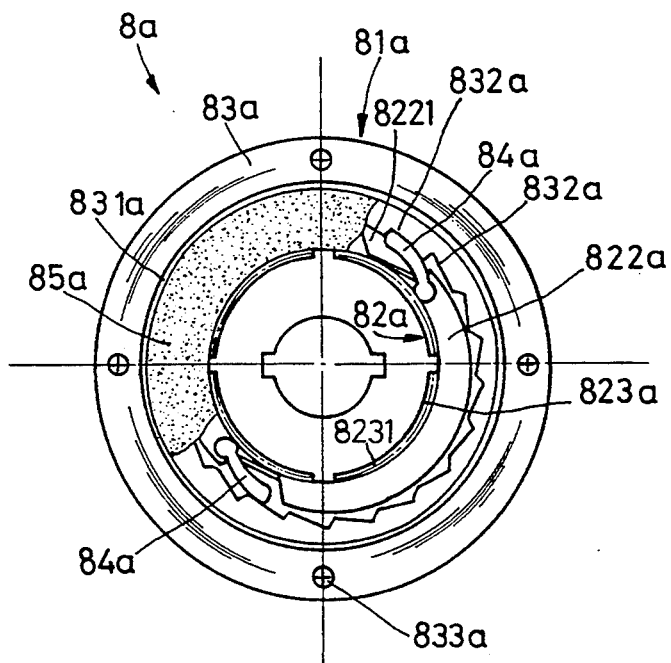
FIG. 6 is an elevation view, partially cut away, of the single directional transmission embodiment of FIG. 5.

As shown in FIGS. 5 and 6, a toothed single directional assembly 8a provides an alternate single directional transmission drive. The assembly 8a includes a rotating body 81a, having an outer edge surface of its axle cavity which forms a collar 812a, identical to the collar of the embodiment shown in FIG. 3, and is mounted with an insertion body 813a. A transmission casing 82a is included having a lower edge with a relatively large diameter flange 821a, and which is positioned adjacent the recessed surface 814a within the rotating body 81a. The middle section of the transmission casing 82a is formed with a circular recess 8221 in which is inserted an extendable, flexible stopper. The upper section 823a of the transmission casing 82a has threads 8231 and 8232 formed on its inner and outer surfaces, respectively. The internal threads 8231 can be screwed into the right threaded sleeve 411 on the above hub 41. A positioner 83a has an outer edge which utilizes threaded fasteners 833a to screw into and form a single unit with rotating body 81a. Positioner 83a is formed with a collar 831a having its inner cylindrical surface formed with teeth, which can be engaged by the stopper 83a. A collar 85a, which is fitted with threads 851a, can be threadedly engaged with the external threads formed on the outside of the transmission casing 82a, allowing it to be positioned within the collar 831a of the positioning body 83a.

By means of the assembly defined by the above mentioned components, as shown in FIG. 6, when the rotating body 81a and positioner 83a are moving in a forward motion, the stopper 84a on the transmission casing 82a will be engaged with the teeth 832a. However, when pedal driven, the transmission casing 82a is moved by the hub 41 and rotates forward within the rotating body. At this time, the stopper slips over the teeth. Such causes the transmission casing to spin freely inside the rotating body 81a, allowing the bike to be freely pedal driven.

The electric bicycle incorporating this invention can be used normally as a conventional bicycle, as shown in FIG. 1. Using pedals 16 and drive chain 17, the single directional sprocket 42, shown in FIG. 7, can be driven. The chain sprocket 42 is screwed into the left threaded sleeve 412 on hub 41. Sprocket 42 by means of the axle bearings 413, 414 inside the respective sleeves 411 and 412 allows it to turn upon axle 43. So, when the sprocket 42 is rotating forward, it causes the rear wheel 15 to spin identically to an ordinary pedal driven bicycle.

When the electric bicycle is switched over to automatic, by a signal input from the handle bar 13, the battery pack 2 supplies the D.C. motor 31 with power, allowing the D.C. motor to put the small bevel gear wheel 311 in motion. The small bevel gear wheel 311 moves the large bevel gear wheel 33, providing a slower speed, but increasing an output torque. Therefore, when the large bevel gear wheel 33 is in motion, it causes the single directional transmission drive to rotate forward and then finally causes the hub 41 to rotate.

Referring to FIG. 8, the shifting controller 5 is shown, whose primary use is to control the D.C. motor 31. A photo sensor 51 utilizes the shifting controller 131 located at the bicycle handlebars to pull the lead wire of a light cover. The photo sensor 51 will transfer a signal representative of the relative position of the shifting controller 5 in to a voltage, and sends it to the later stages of the PWM circuit.

A pulse width moderator (PWM) 52 is connected to an oscillator (OSC) 53, the OSC 53 providing a reference signal which the PWM requires. After the PWM obtains the signal, the photo sensor 51 provides the voltage for comparison. From this, a 0%–100% pulse width signal can be obtained reflecting the relative position of the shifting controller 5. This signal is used to control the effective power delivered to the motor 31, and thereby change the speed of the motor 31.

An output driver 54 transforms the small signal from the PWM by means of a high power MOSFET into a high voltage, high power output required by the driving motor. A protect circuit 55 is connected to the output driver 54 for cutting the power circuit by means of the brake control 7, when irregularities occur as a way of protecting the unit.

A current sensor 56 and a comparator 57 monitor the motor 31, by transforming the electric current passing through the motor into a voltage and comparing it with the voltage reference of the comparator. When the electric current is too great, the comparator 57 will send out a high voltage, enabling the PWM circuit to automatically limit the electric current of the motor 31, protecting the motor 31 and output driver 54 circuits.

A regulator 58 is provided to regulate the battery voltage while the bicycle is travelling, or when road conditions and the load are creating an unsteady electric voltage, to ensure normal operation of the bicycle. A power delay circuit 59 provides a delay signal when the power is turned on, to prevent a sudden start up of the bicycle when the shifting controller happens to be the full speed position. A key switch 60 is provided, such being a mechanical power control. It acts as the bicycle key when the bicycle is shut off, a power shutoff device when there is a problem with the power and also sends a signal to the protect circuit to completely shut off the motor 31.

A brake control input is provided to carry a signal which is issued from the brake. When braking, the protect circuit 55 will temporarily shut off the circuit and also clear the pulse width modulator 52. After the brake control input 7 signal is stopped, the circuits will operate again. Unwanted acceleration of the accelerator during braking is also prevented, this is added to the function of the protect circuit 55. This can provide added protection when any problem appears with the bicycle. In this way, both the protect circuit and the key switch can shut off the motor to protect the user. The combination of the above mentioned devices have the function of regulating current, braking the bicycle, delaying start up and protecting the circuits, allowing the electric bike to be afforded stability and safety when the bicycle is travelling.

Figure 9A:
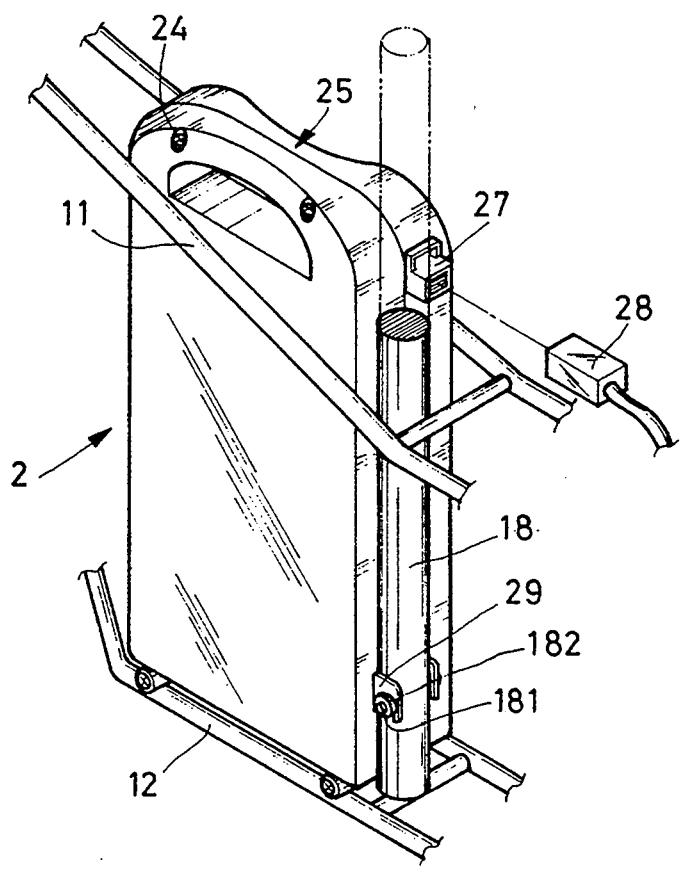
FIG. 9A is an enlarged perspective view of the battery pack of the present invention installed in a bicycle.
Figure 9B:
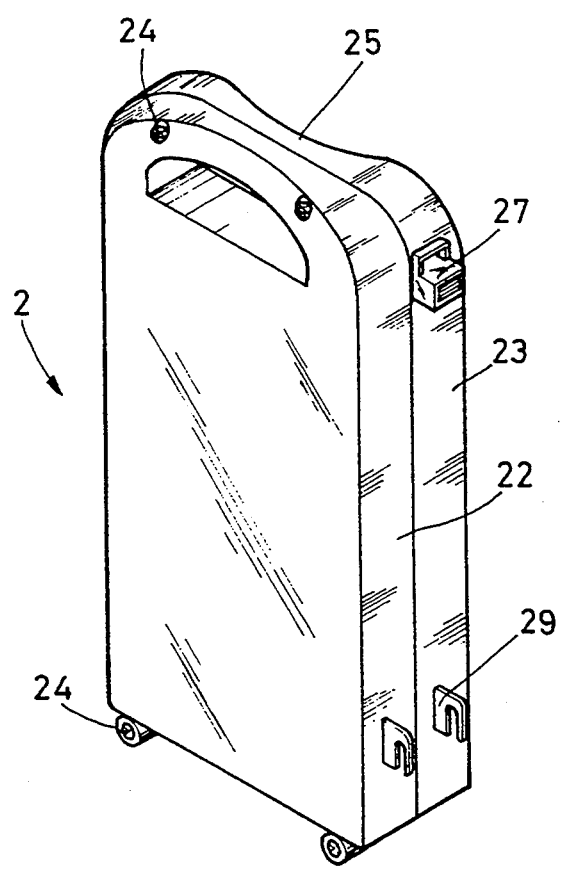
FIG. 9B a perspective view of the battery pack of the present invention.

FIG. 9A schematically shows the battery pack position on bike frame 1. FIG. 9B is an illustration of the outward appearance of the battery pack, and FIG. 9C is an exploded view of the battery pack assembly. The battery pack 21 uses two symmetrical shells 22, 23 to encase the battery, with screws 24 to secure the two shells one to the other. The top of the shells form a hand grip 25 for extra convenience when carrying the battery pack. A fuse 26 is located within shell 23 and the positive terminal 211 and negative terminal 212 form a serial connection with the fuse 26. The other negative terminal 211a and positive terminal 212a connect to an output socket 27. By means of this arrangement, one can quickly connect the D.C. motor to the power socket 28.

The interior side edges of each shell have a U-shaped clip 29 formed thereon for attachment by means of bolts protruding from both ends of the bike seat tube 18 for securement with nuts 182. Therefore, the battery pack 2 can be firmly supported by the bottom tube 12 and positionally captured by means of the forked shape of the other support 11, and then screwed onto the seat tube 18. In all, this mounting is extremely stable. When recharging, only the nut 182 needs to be untightened and the power connector 28 removed from the connector 27, at which time the battery pack 2 can be removed by using the hand grip 25. This makes changing and using the battery pack quicker.

I claim:

1. An electrical bicycle comprising:
   a bike frame having upper support and a bottom tube extending longitudinally between a steering support tube and a bicycle seat support tube, said bike frame including a handlebar rotatively to said steering support tube and a plurality of rear stays extending from said bicycle seat support tube;
   a battery pack mounted between said upper support and said bottom tube;
   a shifting controller mounted centrally on said bike frame and coupled to said handlebar for providing a control signal;
   a driving assembly secured to a side of one of said plurality of rear stays, said driving assembly including:
   a. a D.C. motor having a small bevel gear wheel mounted on an output shaft thereof and a flange formed on an upper end of said D.C. motor, said flange having an opening formed therethrough for securing said D.C. motor to said one of said plurality of rear stays;
   b. a base mount located at the outer edge of said small bevel gear wheel having a centrally located circular recess formed therein, said base mount having a pair of mounting flanges disposed on opposing sides thereof for securement to said one of said plurality of rear stays;
   c. a large bevel gear wheel positioned at the center of said circular recess and meshingly engaged with said small bevel gear wheel on one side thereof and having a first collar extending from an opposing side of said large bevel gear wheel, said first collar having a pair of recess openings formed therein;
   d. a fixed base fixedly coupled to said base mount and having a base collar extending therefrom;
   e. a bearing disposed between said base collar and said large bevel gear wheel;
   f. a hub rotatively supported on a bicycle wheel axle and having a pair of threaded sleeves formed on opposing sides thereof, a first of said pair of threaded sleeves being coupled to a bicycle chain sprocket for rotating said hub responsive to rotation of a pair of bicycle pedals; and,
   g. a single directional transmission drive coupled to a second of said pair of threaded sleeves of said hub for rotatively driving said hub, said single directional transmission drive including
      1) a rotating body having a through opening for passage of said bicycle wheel axle and a second collar formed about a perimeter edge of said through opening of said rotating body having a pair of insert bodies formed thereon for respective engagement with said pair of recess openings of said first collar, said rotating body having a recess opening formed coaxial said through opening for said bicycle wheel axle;
      2) a transmission casing having a centrally disclosed threaded through opening formed therein for coupling with said second thread sleeve hub, said transmission casing being disposed within said recess opening of said rotating body;
      3) means for rotatively coupling said transmission casing to said rotating body in one of two opposing directions to thereby allow said hub to be pedal driven; and,
      4) a cover secured to said rotating body for securing said transmission casing within said recess opening of said rotating body; whereby said D.C. motor directly drives said hub without limiting driving said hub by pedalling.

2. The electrical bicycle as recited in claim 1 where said means for rotatively coupling includes:
   a. a plurality of teeth formed on a cylindrical wall defining a perimeter of said recess opening of said rotating body; and,
   b. a flexible stopper extending from an external surface of said transmission casing for unidirectional engagement with said teeth of said rotating body.

3. The electrical bicycle as recited in claim 1 further comprising a control circuit having a first input coupled to said shifting controller, a second input coupled to said battery pack, and an output coupled to said D.C.

motor for controlling a speed thereof responsive to said control signal.

4. The electrical bicycle as recited in claim 1 where said battery pack includes a housing formed by a pair of shells joined one the other, each of said pair of shells having a U-shaped clip extending therefrom for securing said battery pack to said bicycle seat support tube.

* * * * *